United States Patent
Dash et al.

(10) Patent No.: US 9,913,306 B2
(45) Date of Patent: Mar. 6, 2018

(54) COMMUNICATION TERMINAL AND METHOD FOR ESTABLISHING A CSFB CALL

(71) Applicant: Intel IP Corporation, Santa Clara, CA (US)

(72) Inventors: Deepak Dash, Khordha (IN); Nitin Gowda Basavarajappa, Breinigsville, PA (US); Vijay Katakam, Bangalore (IN); Udaysinh Bhosale, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/706,020

(22) Filed: May 7, 2015

(65) Prior Publication Data
US 2016/0330778 A1    Nov. 10, 2016

(51) Int. Cl.
*H04W 76/02*     (2009.01)
*H04B 17/309*    (2015.01)
(Continued)

(52) U.S. Cl.
CPC ........ *H04W 76/023* (2013.01); *H04B 17/309* (2015.01); *H04W 36/0022* (2013.01);
(Continued)

(58) Field of Classification Search
CPC ............. H04W 76/023; H04W 76/027; H04W 36/0022; H04W 36/36; H04W 76/026; H04B 17/309
(Continued)

(56) References Cited

U.S. PATENT DOCUMENTS

| 8,744,466 B2* | 6/2014 | Hirano | H04W 24/02 455/449 |
| 2005/0079870 A1* | 4/2005 | Rick | H04W 60/04 455/437 |

(Continued)

FOREIGN PATENT DOCUMENTS

| EP | 2725848 A2 | 4/2014 |
| WO | 2012037280 A1 | 3/2012 |
| WO | 2013025714 A1 | 2/2013 |

OTHER PUBLICATIONS

European Search Report received for the corresponding EP Patent Application No. 16164127.9, dated Sep. 20, 2016, 10 pages of Search Report.

(Continued)

*Primary Examiner* — Babar Sarwar
(74) *Attorney, Agent, or Firm* — Viering, Jentschura & Partner mbB

(57) ABSTRACT

A communication terminal is described comprising a communication circuit configured to establish a first radio link to a first communication network; and to receive, via the first radio link to the first communication network, a message from the first communication network that indicates establishing a second radio link to a second communication network for a call; a controller configured to select at least one channel frequency from a plurality of stored channel frequencies provided for the call to the second communication network; control the communication circuit to establish the second radio link to the second communication network using the selected at least one channel frequency and to establish the call via the established second radio link.

19 Claims, 11 Drawing Sheets

(51) Int. Cl.
*H04W 36/00* (2009.01)
*H04W 36/36* (2009.01)

(52) U.S. Cl.
CPC .......... *H04W 36/36* (2013.01); *H04W 76/026* (2013.01); *H04W 76/027* (2013.01)

(58) Field of Classification Search
USPC .... 455/412.1–414.2, 418–422.1, 435.1–453, 455/456.1, 552.1, 41.1–41.2; 370/328–332, 338, 341
See application file for complete search history.

(56) References Cited

U.S. PATENT DOCUMENTS

| | | | | |
|---|---|---|---|---|
| 2007/0207824 | A1* | 9/2007 | Bhattacharjee | H04W 24/10 455/513 |
| 2010/0184433 | A1* | 7/2010 | Plestid | H04W 48/18 455/435.2 |
| 2012/0064884 | A1* | 3/2012 | Ramachandran | H04W 36/0022 455/422.1 |
| 2013/0007039 | A1* | 1/2013 | Edara | H04W 48/16 707/769 |
| 2013/0183981 | A1* | 7/2013 | Singh | H04W 36/0016 455/437 |
| 2014/0071944 | A1* | 3/2014 | Narasimha | H04W 36/0055 370/331 |
| 2014/0349662 | A1 | 11/2014 | Ekici et al. | |
| 2015/0087308 | A1* | 3/2015 | Jeong | H04W 36/0022 455/436 |
| 2015/0105070 | A1* | 4/2015 | Kotreka | H04W 48/17 455/434 |
| 2015/0296423 | A1* | 10/2015 | Zhang | H04W 36/0022 455/436 |
| 2015/0351009 | A1* | 12/2015 | Patel | H04W 36/0083 455/434 |

OTHER PUBLICATIONS

European Office Action based on application No. 16 164 127.9 (8 pages) dated Oct. 30, 2017 (Reference Purpose Only).

* cited by examiner

COMMUNICATION TERMINAL AND METHOD FOR ESTABLISHING A CSFB CALL

TECHNICAL FIELD

Embodiments described herein generally relate to communication terminals and methods for establishing a voice call.

BACKGROUND

A communication network may use another communication network as a fallback for a circuit-switched call when it does not support circuit-switched calls itself. For example, an LTE network may use a GSM network for a CSFB (circuit-switched fallback) to handle circuit-switched calls. To avoid delays of call establishment and call failures, efficient fallback procedures are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
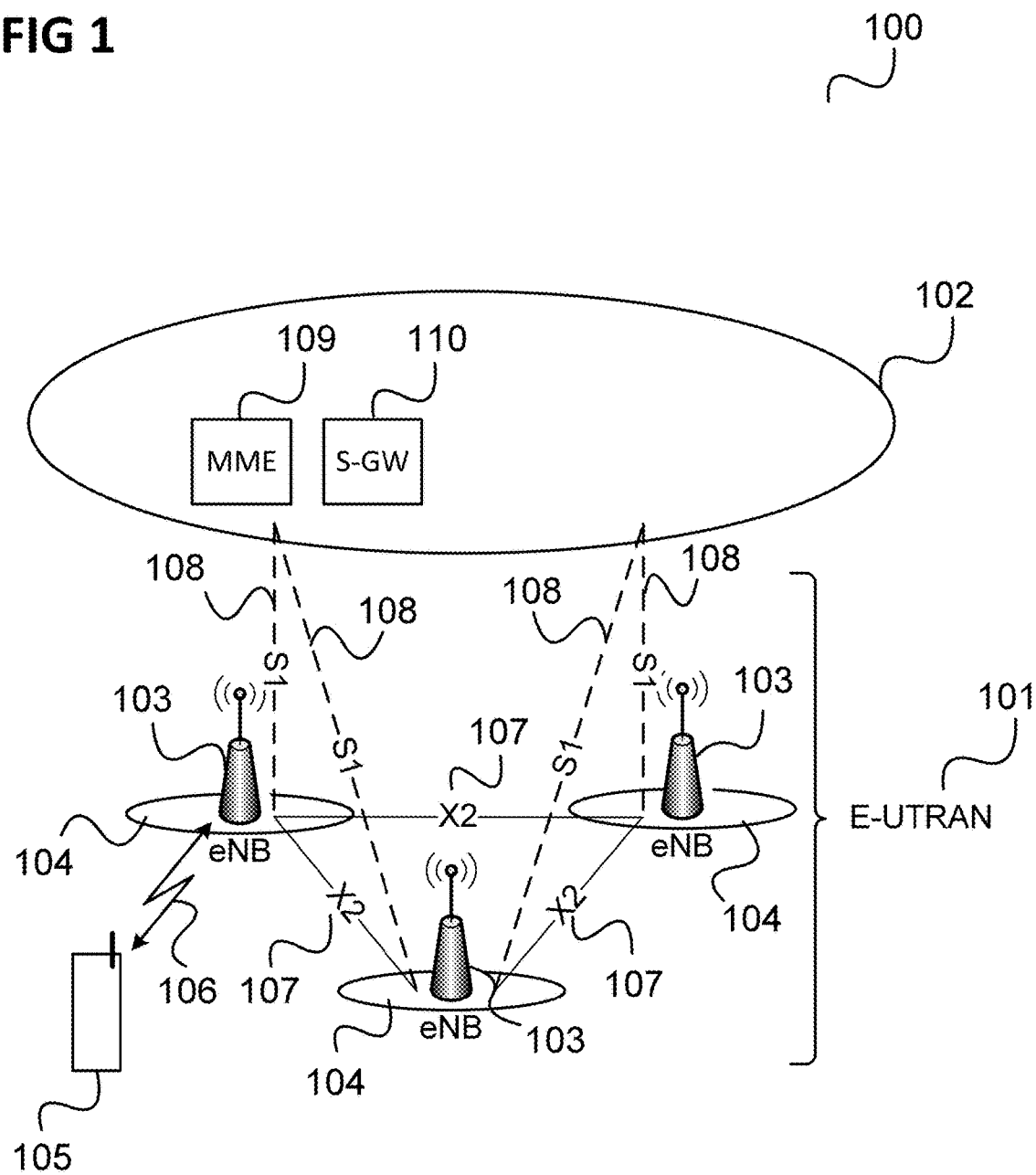
FIG. 1 shows a communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. a UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Covergence Protocol) layer, the RLC (Radio Link Control) layer and the MAC (Medium Access Control) layer and control plane terminations including the RRC (Radio Resource Control) layer towards the mobile terminal 105. The mobile terminal 105 for example includes typical components such as a speaker, a microphone and a memory, an application processor and a modem.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices such as another mobile terminal.

In practice, a plurality of communication networks including a radio access network 101 and a core network 102 as described above are provided by different operators such that the coverage areas of the communication networks overlap, i.e. a mobile terminal may be located within a radio cell 104 operated by a base station 103 belonging to a first communication network of a first operator and at the same time be located within a radio cell 104 operated by a base station 103 belonging to a second communication network of a second operator, wherein the communication networks may be configured according to different RATs (radio access technologies).

Figure 2:
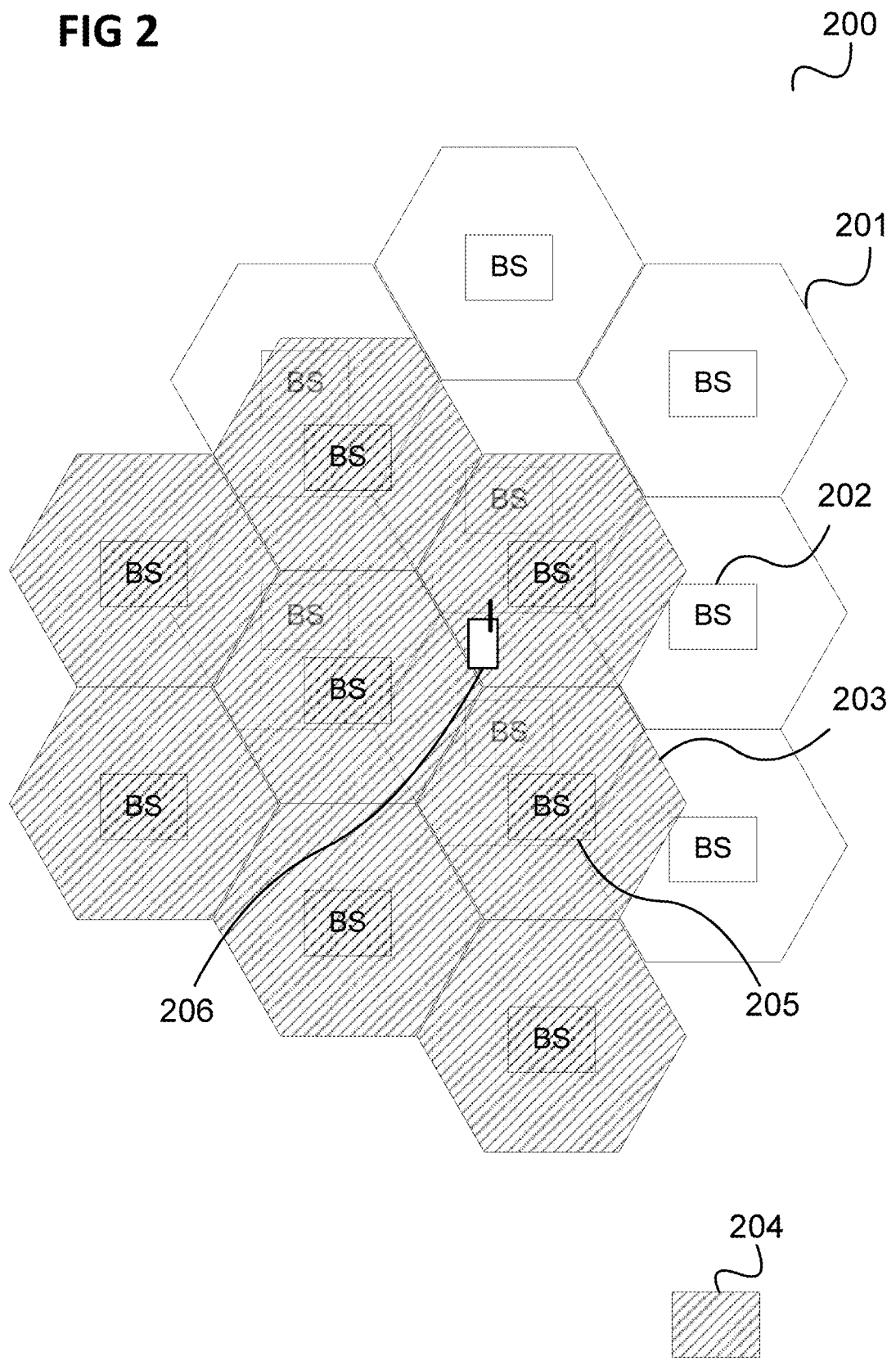
FIG. 2 shows a radio cell arrangement according to an embodiment.

This is illustrated in FIG. 2.

FIG. 2 shows a radio cell arrangement 200 according to an embodiment.

The radio cell arrangement 200 includes a first plurality of radio cells 201 (shown without hatching) operated by a plurality of first base stations 202 of a first communication network, and a second plurality of radio cells 203 indicated by a hatching 204 operated by a plurality of second base stations 205 of a second communication network.

As illustrated, the second plurality of radio cells 203 overlaps the first plurality of radio cells 204 such that a mobile terminal 206 located in the overlapping area may connect to both the first communication network and the second communication network, e.g. may both register with a base station 202 of the first communication network and a base station 205 of the second communication network.

Such an arrangement allows the mobile terminal 206 to use one of the communication networks for a certain service, e.g. the communication network which provides a higher service quality or the communication network which offers a certain service at all. For example, when the first communication network is an LTE communication network which does not support a circuit-switched call, the first communication network can request the mobile terminal 206 to use the second communication network which does support a circuit-switched call, e.g. a UMTS communication network or a GSM communication network. This mechanism is referred to as CSFB (circuit switched fallback).

Figure 3:
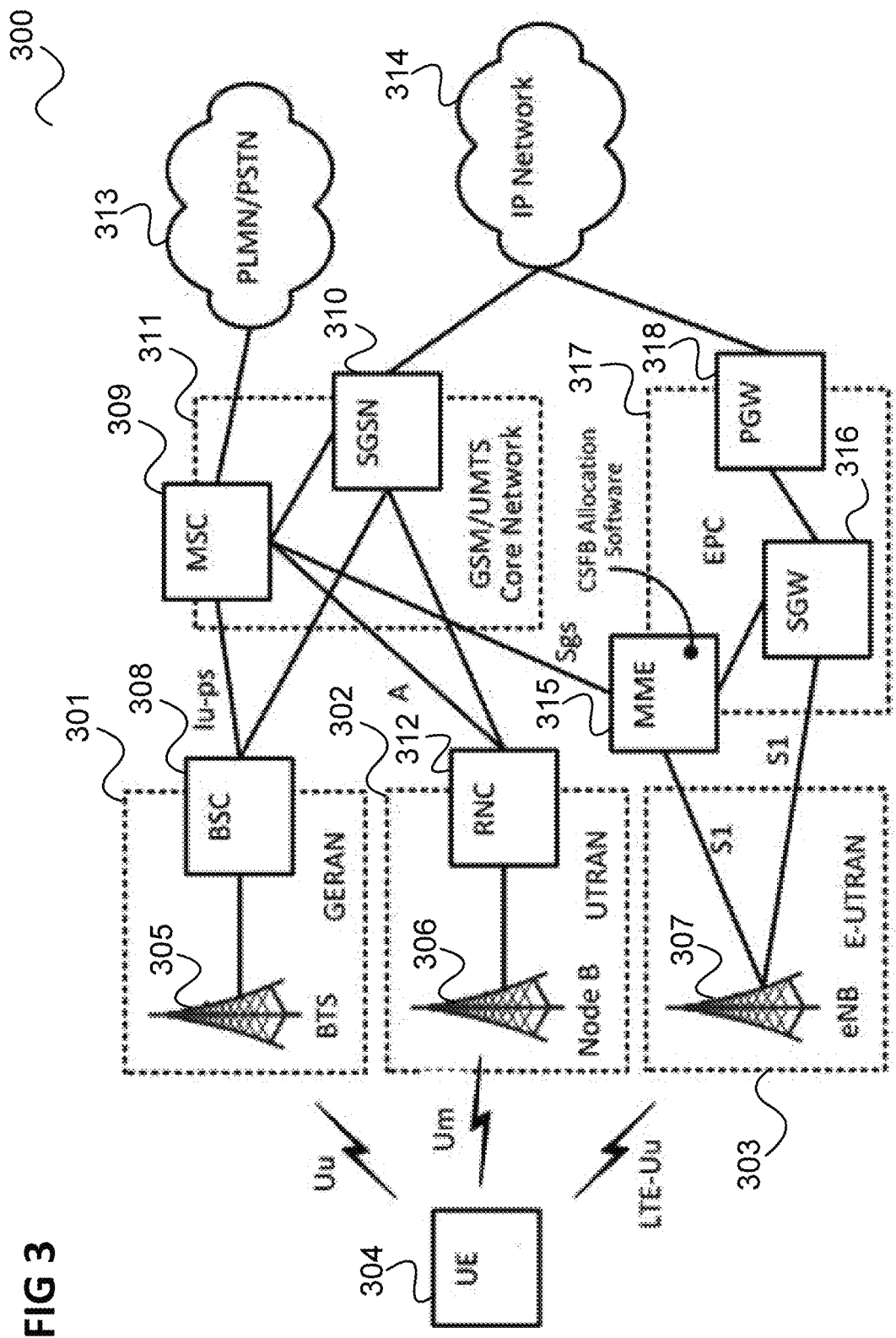
FIG. 3 shows a communication arrangement including a GSM radio access network, a UMTS radio access network and an LTE radio access network.

FIG. 3 shows a communication arrangement 300 including a GSM radio access network 301 (GERAN), a UMTS radio access network 302 (UTRAN) and an LTE radio access network 303 (E-UTRAN).

A mobile terminal 304 may communicate with each radio access network 301, 302, 303 via a respective base station 305, 306, 307. The GERAN 301 is coupled via a BSC (Base Station Controller) 308 to an MSC (Mobile Switching Center) 309 and an SGSN (Serving GPRS Support Node) 310 of a GSM/UTMS core network 311. The UTRAN 302 is coupled via an RNC (Radio Network Controller) 312 to the MSC 309 and the SGSN 310. The MSC 309 provides access to a PLMN/PSTN (Public Land Mobile Network/Public Switched Telephone Network) 313 and the SGSN 319 provides access to an IP (Internet Protocol) network 314

The LTE base station 307 is coupled to an MME (Mobility Management Entity) 315 and an SGW (Serving Gateway) 316 of an EPC (Evolved Packet Core) 317. The MME 315 provides access to the PLMN/PSTN 313 via the MSC 309. The SGW 316 provides access to the IP network 314 via a PGW (Packet Data Network Gateway) 318.

Figure 4:
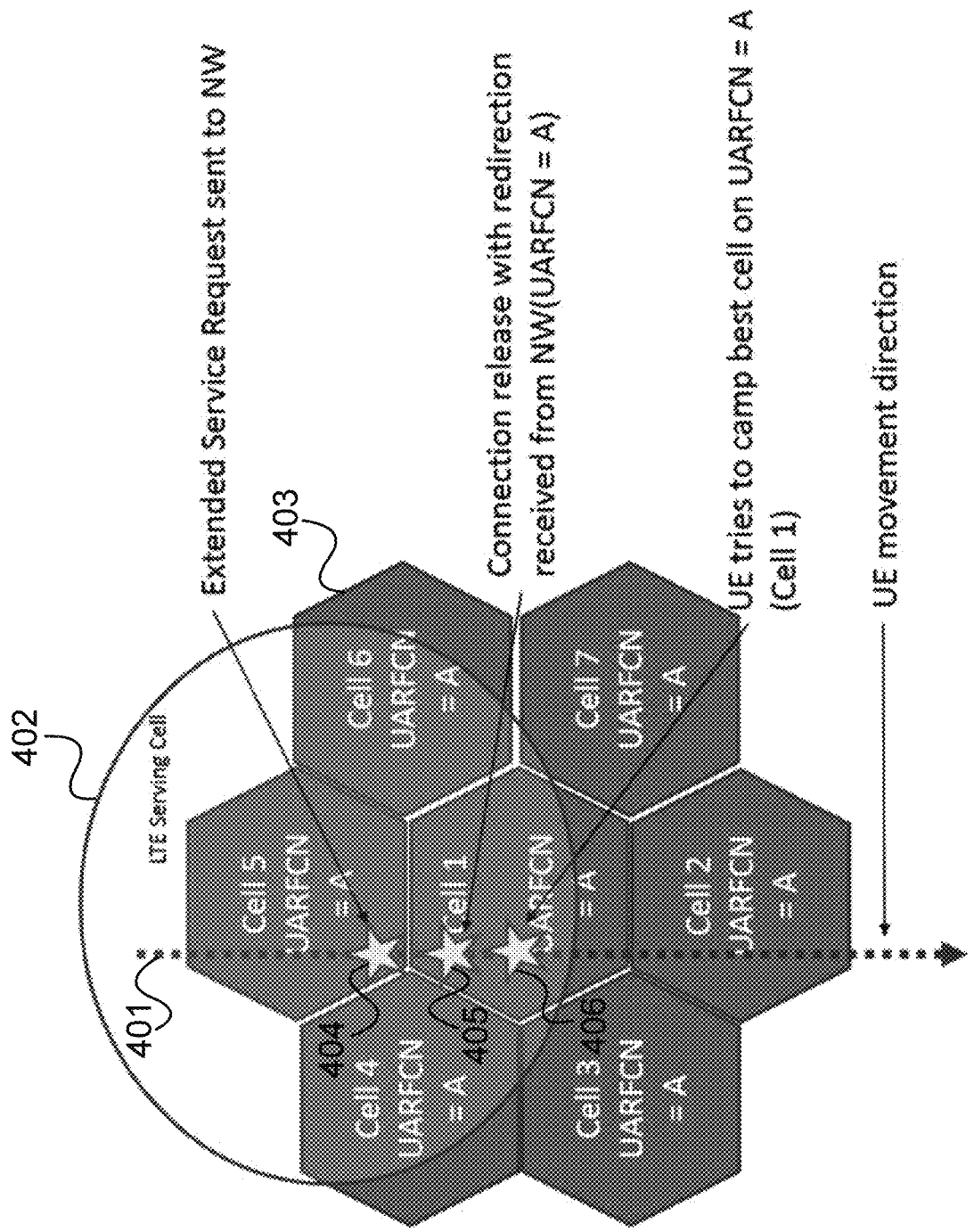
FIG. 4 illustrates a CSFB to a UMTS network.

FIG. 4 illustrates a CSFB to a UMTS network.

It is assumed that a mobile terminal moves along a path 401 through the coverage area of an LTE communication network including an LTE radio cell 402 and through the coverage area of a UMTS communication network including a plurality of UMTS cells 403 referred to as Cell 1 to Cell 7.

The LTE communication network for example corresponds to the first communication network with cells 201 of FIG. 2 and the UTMS communication network for example corresponds to the second communication network with cells 203 of FIG. 2. It is assumed that the mobile terminal is camping on the LTE radio cell 402, i.e. the LTE radio cell 402 is the serving cell of the mobile terminal for the LTE communication network.

It is further assumed that the mobile terminal is configured for CSFB and that at a first position 404, the mobile terminal detects that a call with another communication terminal is to be established. For example, the mobile terminal receives paging information indicating that a call is to be established (i.e. there is a mobile-terminated call to be established) or its user has initiated a call by a corresponding input (i.e. there is a mobile-originated call to be established).

Accordingly, the mobile terminal sends an extended service request to the LTE communication network, e.g. to the E-UTRAN of the LTE communication network.

A certain time later, when the mobile terminal has moved to a second position 405, the LTE network sends a connection release message with redirection to the mobile terminal. This message can be seen as a message indicating that the mobile terminal is to establish a radio link to the UMTS communication network for the call. The communication network provides one UARFCN (UTRA Absolute Radio Frequency Channel Number) as redirected frequency. Typically, an operator of a UMTS communication network uses one UARFCN value for all UMTS cells (at least in a certain area e.g. a city or country) to provide service such that the UARFCN provided by the network corresponds to all UMTS radio cells 403 in the vicinity of the mobile terminal.

After again a certain time, when the mobile terminal has moved to a third position, it selects the best cell of the UMTS radio cells 403, i.e. the radio cell 403 with the highest received power level to camp on and proceeds with the CSFB procedure, i.e. establishes the call via the selected radio cell 403 and the UMTS communication network.

In other words, when a mobile terminal is redirected to UMTS and moves from LTE to UMTS for performing CSFB it measures the best cell for the UARFCN given by the network and camps on that cell and proceeds with the CSFB procedure.

In contrast, during CSFB from an LTE communication network to a GSM communication network (e.g. i.e. a CSFB from 4G to 2G) the network typically provides one static redirected ARFCN value (or at most a list of some ARFCN values) which corresponds to only one (or at most some) of the available GSM radio cells in the vicinity of the mobile terminal and may not represent the best radio cell at the location of the mobile terminal. This is illustrated in FIG. 5.

Figure 5:
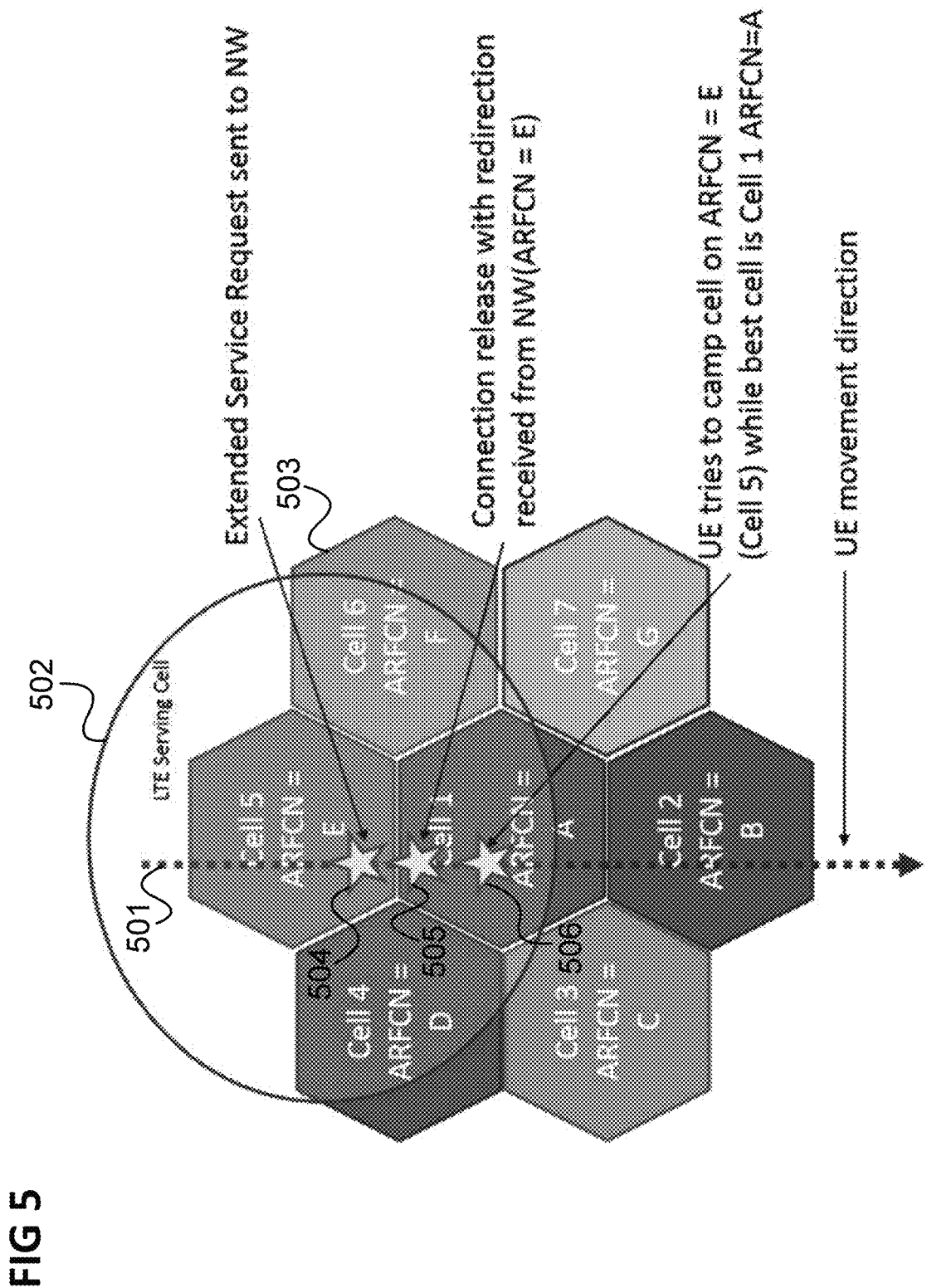
FIG. 5 illustrates a CSFB to a GSM network.

FIG. 5 illustrates a CSFB to a GSM network.

It is assumed that a mobile terminal moves along a path 501 through the coverage area of an LTE communication network including an LTE radio cell 502 and through the coverage area of a GSM communication network including a plurality of GSM cells 503 referred to as Cell 1 to Cell 7.

The LTE communication network for example corresponds to the first communication network with cells 201 of FIG. 2 and the GSM communication network for example corresponds to the second communication network with cells 203 of FIG. 2. It is assumed that the mobile terminal is camping on the LTE radio cell 502, i.e. the LTE radio cell 502 is the serving cell of the mobile terminal for the LTE communication network.

It is further assumed that the mobile terminal is configured for CSFB and that at a first position 504, the mobile terminal detects that a call with another communication terminal is to be established. For example, the mobile terminal receives paging information indicating that a call is to be established (i.e. there is a mobile-terminated call to be established) or its user has initiated a call by a corresponding input (i.e. there is a mobile-originated call to be established).

Accordingly, the mobile terminal sends an extended service request to the LTE communication network, e.g. to the E-UTRAN of the LTE communication network. A certain time later, when the mobile terminal has moved to a second position 505, the LTE network sends a connection release message with redirection to the mobile terminal. This message can be seen as a message indicating that the mobile terminal is to establish a radio link to the UMTS communication network for the call. The communication network provides one ARFCN (Absolute Radio Frequency Channel Number), namely ARFCN=E, as redirected frequency.

However, while in the example of FIG. 4 all UMTS cells 403 operate at the UARFCN provided by the network (UARFCN=A) the GSM cells 503 operate at different ARFCNs A to G.

Accordingly, when the mobile terminal is at a third position 506, the mobile terminal tries to camp on the radio cell 503 with ARFCN=E (Cell 5) while the best cell is Cell 1 with ARFCN=A.

Thus, since the ARFCN provided by the LTE network may not correspond to the best cell, camping on that cell may fail resulting in a call failure or delay in call establishment. This issue may become more evident in densely populated regions and where networks usually deploy multiple frequency re-use topology to cater to the dense user population and geographic requirements.

The case that the LTE network does not provide the ARFCN corresponding to the best cell may occur due to incorrect NW configuration or a high mobility condition of the mobile terminal. A reason may also be that the LTE network uses blind redirection to the GSM network or only has GSM cell information or the GSM network has a high frequency re-use deployment.

The result of this issue is typically that mobile terminals have many failed attempts of camping on to a GSM cell in CSFB to a GSM network. Also, it may lead to a BCCH (Broadcast Control Channel) error of the GSM cell to which a mobile terminal is redirected.

In the example of FIG. 5, to recover from this situation the mobile terminal may perform a (typically high number of) ARFCN/cell scans across a plurality of frequency bands to find the best or at least a better cell than Cell 5. However, this increases the risk of the mobile terminal missing the paging window of a MT CSFB call at a MSC (mobile-services switching service center) or delayed MO CSFB establishment.

In fact, in certain networks, especially in dense user populated regions, MT CSFB call failures of up to 70% and delayed MO CSFB call setups can be observed due to lengthy cell searches on the target GSM network because of many failed attempts of cell camping on weak cells or cells which are not available.

Figure 6:
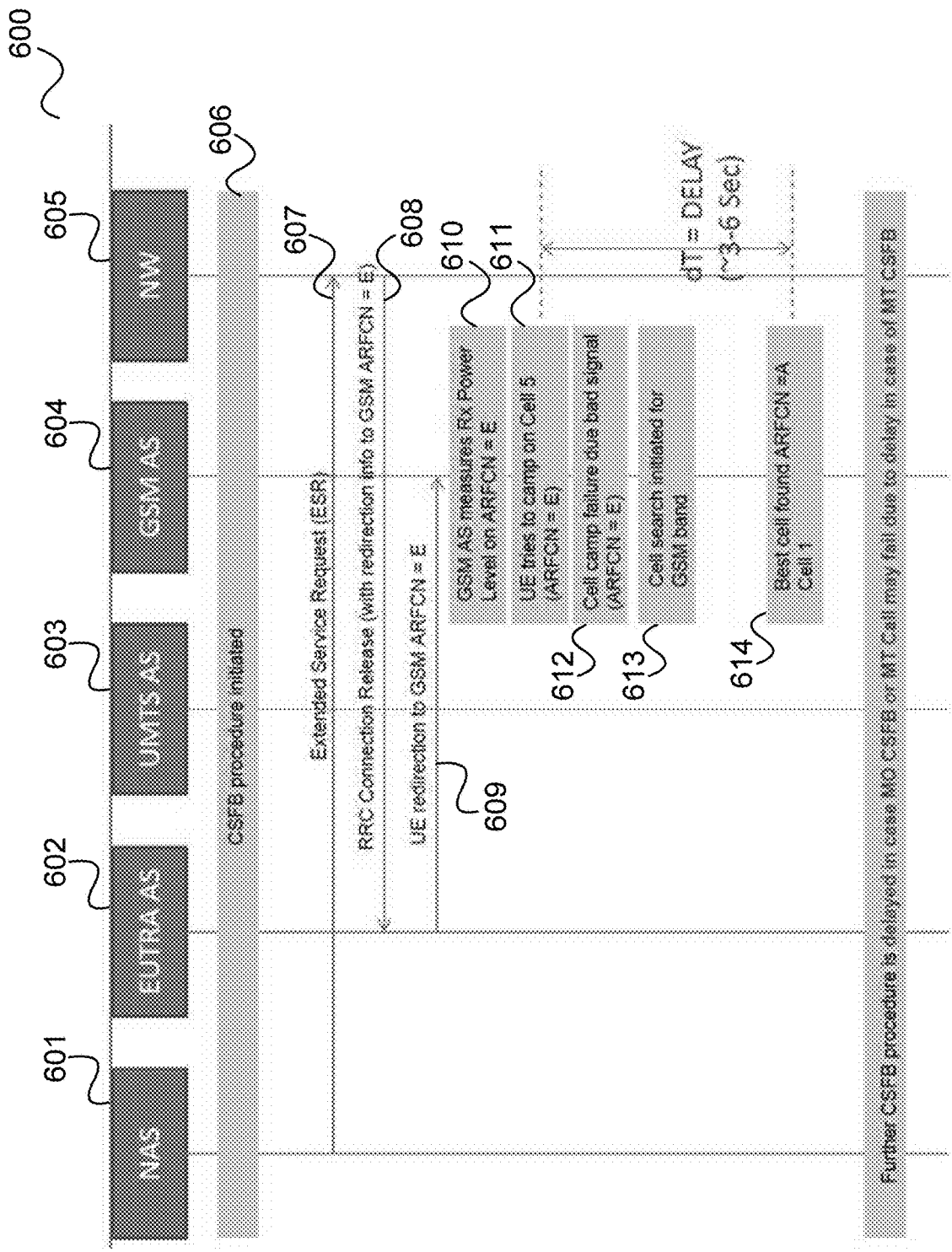
FIG. 6 shows a message flow diagram for a CSFB of a mobile terminal from an LTE network to a GSM network as illustrated in FIG. 5.

FIG. 6 shows a message flow diagram 600 for a CSFB of a mobile terminal from an LTE network to a GSM network as illustrated in FIG. 5.

The message flow takes place between the mobile terminal's NAS (Non-Access Stratum) 601, the mobile terminal's EUTRA AS (Access Stratum) 602, the mobile terminal's UMTS AS 603, the mobile terminal's GSM AS 604 and the LTE network 605, e.g. the LTE network's EUTRAN.

In 606, the CSFB procedure is initiated, e.g. by a request for an MO or MT circuit-switched call.

In 607, the mobile terminal's NAS 601 transmits an extended service request message to the network 605. In 608, the network 605 transmits an RRC connection release message to the mobile terminal's EUTRA AS 602. As described with reference to FIG. 5, the RRC connection release message includes the redirection info that the mobile terminal is redirected to ARFCN=E.

In 609, the mobile terminal's EUTRA AS 602 informs the mobile terminal's GSM AS 604 that a redirection to GSM with ARFCN=E is to be performed.

The mobile terminal's GSM AS 604 measures, in 610, the reception power level for ARFCN=E and tries, in 611, to camp on Cell 5 (corresponding to ARFCN=E).

However, in 612, the camping attempt fails due to bad signal reception since the mobile terminal has moved away from Cell 5 as illustrated in FIG. 5.

Therefore, in 613, the GSM AS 604 initiates a cell search for the GSM band and finds the best cell as Cell 1 with ARFCN=A in 614. However, this leads to a delay of the CSFB of for example 3 to 6 seconds. Thus, the further CSFB procedure is delayed in case of CSFB due to a MO call or may even fail in case of a CSFB due to a MT call, i.e. the MT call may fail.

In the following, an example is described which for example allows reducing the time taken for the selecting of the best GSM cell when a mobile terminal is redirected from LTE for CSFB, e.g. under a mobility condition as illustrated in FIG. 5 and in a situation of a static network configuration of the GSM network. This may allow increasing the MT CSFB call (i.e. an MT call using CSFB) success rate and reducing the delay in establishing an MO CSFB call (i.e. an MO call using CSFB) or an MT CSFB call. Thus, key user experience may be enhanced.

Figure 7:
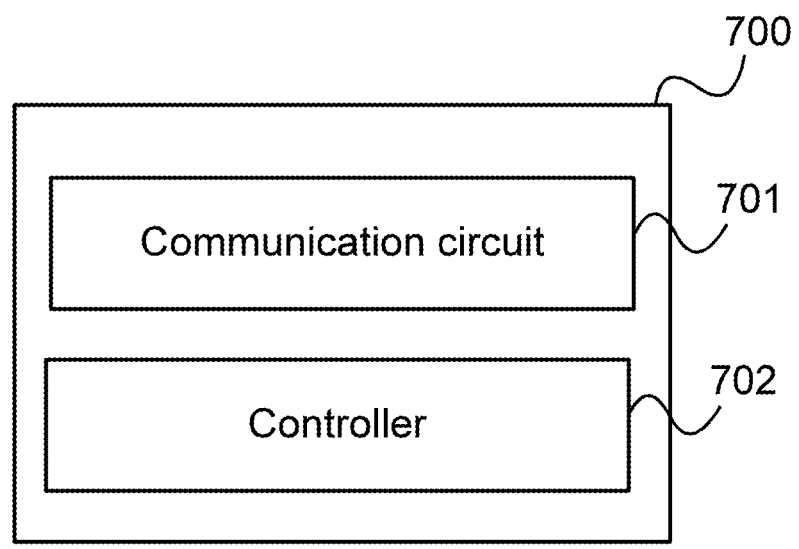
FIG. 7 shows a communication terminal.

FIG. 7 shows a communication terminal 700.

The communication terminal 700 includes a communication circuit 701 configured to establish a first radio link to a first communication network and to receive, via the first radio link to the first communication network, a message from the first communication network that indicates establishing a second radio link to a second communication network for a call (e.g. that indicates that a radio link to the second communication network is to be established for a call to be established).

The communication terminal 700 further includes a controller 702 configured to select at least one channel frequency from a plurality of stored channel frequencies (e.g. stored in a memory of the communication terminal 700) provided for the call to the second communication network; and to control the communication circuit to establish the second radio link to the second communication network using the selected at least one channel frequency and to establish the call via the established second radio link.

In other words, a communication terminal such as a mobile terminal (e.g. a mobile phone) in case of a fallback from a first communication network to a second communication network, e.g. a CSFB from LTE to GSM, uses a list of channel frequency indications, e.g. ARFCNs, of radio cells of the second communication network and searches for a radio cell of the second communication network to camp on among the list of channel frequency indications. Thus rather than trying to camp on the radio cell indicated by the network in the example of FIGS. 5 and 6 and performing a cell search when the camping fails, the mobile terminal performs a power level search based on (e.g. limited to) the predetermined list of channel frequencies.

For example, the mobile terminal uses all operating ARFCNs of the network to which the mobile terminal is redirected, e.g. the GSM service provider's PLMN (public land mobile network) in the area in which the mobile terminal is located, e.g. including the channel frequency indicated by the network (ARFCN=E in the example of FIGS. 5 and 6) while redirecting from LTE to GSM for the CSFB procedure. For example, the mobile terminal measures the power level of all of the ARFCNs, prepares a cell rank list with best power level cells on top and starts trying cell selection (i.e. camping attempts) from the top of the cell rank list. On getting a failure on a camp attempt, the mobile terminal for example moves immediately to the next entry in the cell rank list. For example, only if the camping for all ARFCNs (or generally channel frequency indications) fail, the mobile terminal performs a cell search.

A channel frequency indication may for example be understood as an indication of a carrier frequency of a channel, in other words the frequency of a physical radio carrier, e.g. the uplink frequency and the downlink frequency of a channel pair.

Compared to the approach illustrated in FIGS. 5 and 6, field tests show that the approach of FIG. 7 allows achieving a 100% static MT CSFB call success rate and 90% mobility MT call success rate (i.e. a 60% improvement).

Figure 8:
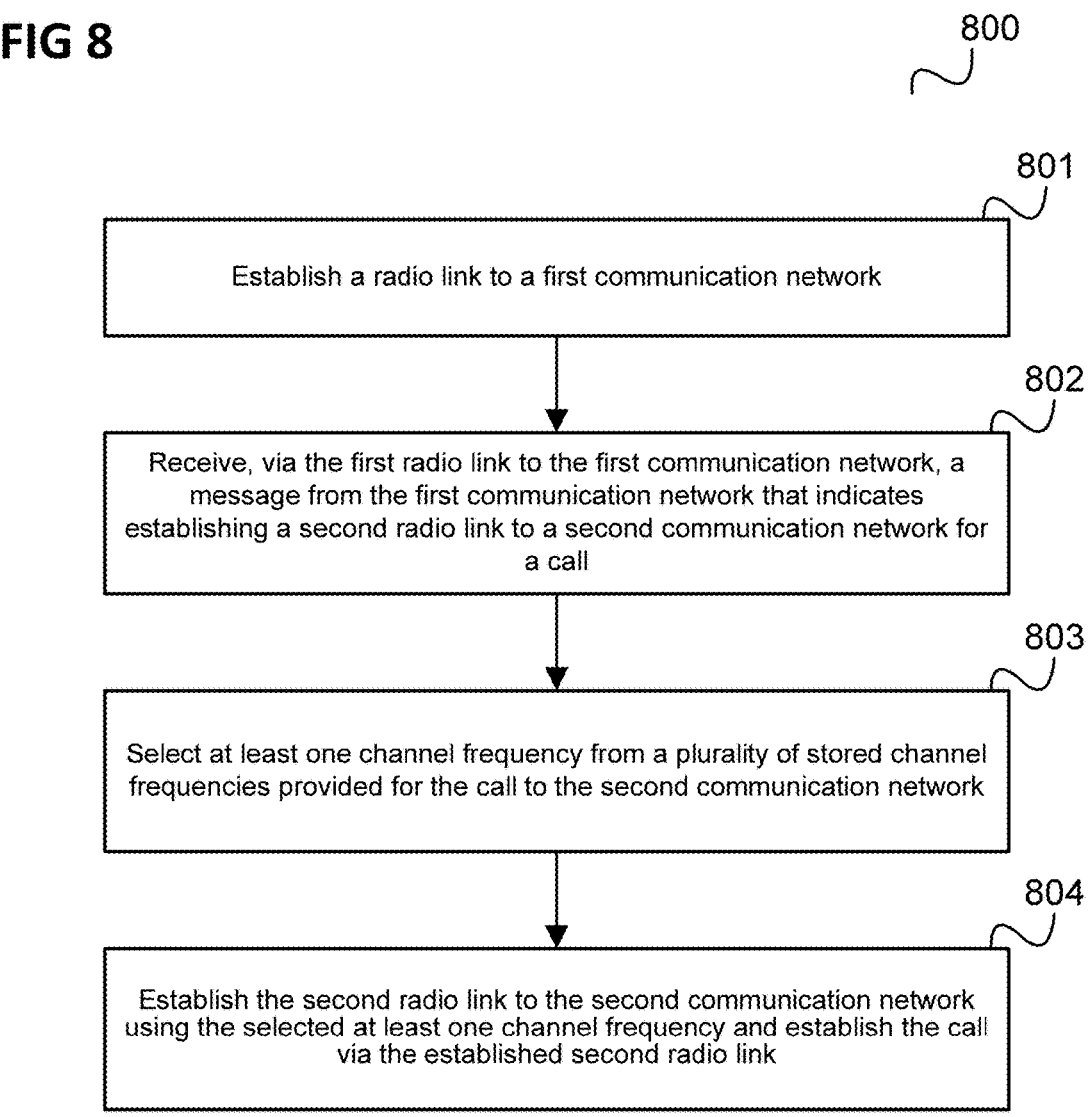
FIG. 8 shows a flow diagram illustrating a method for establishing a call.

The communication terminal 700 for example carries out a method as illustrated in FIG. 8.

FIG. 8 shows a flow diagram 800 illustrating a method for establishing a call, for example carried out by a communication terminal.

In 801, the communication terminal establishes a radio link to a first communication network.

In 802, the communication terminal receives, via the first radio link to the first communication network, a message from the first communication network that indicates establishing a second radio link to a second communication network for a call (e.g. that indicates that a radio link to the second communication network is to be established for a call to be established).

In 803, the communication terminal selects at least one channel frequency from a plurality of stored channel frequencies provided for the call to the second communication network (e.g. based on the results of a power level search).

In 804, the communication terminal establishes the second radio link to the second communication network using the selected at least one channel frequency and establishes the call via the established second radio link It should be noted that the communication terminal may perform 801 to 806 in a different order than the one indicated in FIG. 8. In particular, it may perform 802 before 801.

The following examples pertain to further embodiments.

Example 1 is a communication terminal as illustrated in FIG. 7.

In Example 2, the subject matter of claim 1 can optionally include the controller being configured to measure, for each channel frequency, a received signal quality and to determine a radio cell via which to establish a radio link to the second communication network based on the measured received signal quality.

In Example 3, the subject matter of claim 2 can optionally include the received signal quality for a channel frequency being a received signal strength of a signal received via the channel frequency.

In Example 4, the subject matter of any one of claims 2-3 can optionally include the controller being configured to determine the radio cell via which to establish a radio link to the second communication network based on a comparison of the measured received signal qualities.

In Example 5, the subject matter of any one of claims 2-4 can optionally include the controller being configured to determine the radio cell via which to establish a radio link to the second communication network by determining the radio cell operating at the channel frequency for which it has measured the best received signal quality.

In Example 6, the subject matter of any one of claims 1-5 can optionally include comprising a memory configured to store, for each of a plurality of second communication networks, a plurality of channel frequency indications wherein each channel frequency indication specifies a channel frequency of a radio cell of the respective second communication network and the controller being configured to search among the channel frequencies of that second communication network for which the message indicates that the communication terminal being to establish a radio link to it.

In Example 7, the subject matter of any one of claims 1-6 can optionally include the controller being further configured to determine the plurality of channel frequencies and to store a plurality of channel frequency indications indicating the plurality of channel frequencies in a memory.

In Example 8, the subject matter of claim 7 can optionally include the controller being configured to determine the plurality of channel frequency indications based on system information received by the communication circuit from the second communication network.

In Example 9, the subject matter of any one of claims 1-8 can optionally include the communication circuit comprising a first transceiver for communicating with the first communication network and a second transceiver for communicating with the second communication network.

In Example 10, the subject matter of any one of claims 1-9 can optionally include the communication circuit being configured to transmit a message to the first communication network requesting the establishment of the call.

In Example 11, the subject matter of any one of claims 1-10 can optionally include the channel frequencies being stored by means of absolute radio frequency channel numbers.

In Example 12, the subject matter of any one of claims 1-11 can optionally include the first communication network being an LTE communication network.

In Example 13, the subject matter of any one of claims 1-12 can optionally include the second communication network being a GSM communication network.

In Example 14, the subject matter of any one of claims 1-13 can optionally include the call being a circuit-switched call.

In Example 15, the subject matter of any one of claims 1-14 can optionally include the call being a circuit-switched fallback call.

In Example 16, the subject matter of any one of claims 1-15 can optionally include a non-volatile memory configured to store a plurality of channel frequency indications indicating the plurality of channel frequencies.

In Example 17, the subject matter of any one of claims 1-16 can optionally include the communication terminal being a mobile phone.

In Example 18, the subject matter of any one of claims 1-17 can optionally include establishing the radio link to the second communication network comprising camping on the second communication network.

Example 19 is a method for establishing a call as illustrated in FIG. 8.

In Example 20, the subject matter of claim 19 can optionally include measuring, for each channel frequency, a received signal quality and determining a radio cell via which to establish a radio link to the second communication network based on the measured received signal quality.

In Example 21, the subject matter of claim 20 can optionally include the received signal quality for a channel frequency being a received signal strength of a signal received via the channel frequency.

In Example 22, the subject matter of any one of claims 20-21 can optionally include determining the radio cell via which to establish a radio link to the second communication network based on a comparison of the measured received signal qualities.

In Example 23, the subject matter of any one of claims 20-22 can optionally include determining the radio cell via which to establish a radio link to the second communication network by determining the radio cell operating at the channel frequency for which it has measured the best received signal quality.

In Example 24, the subject matter of any one of claims 19-23 can optionally include storing, for each of a plurality of second communication networks, a plurality of channel frequency indications wherein each channel frequency indication specifies a channel frequency of a radio cell of the respective second communication network and searching among the channel frequencies of that second communication network for which the message indicates that a radio link being to be established to it.

In Example 25, the subject matter of any one of claims 19-24 can optionally include determining the plurality of channel frequencies and storing the plurality of channel frequency indications indicating the plurality of channel frequencies in a memory.

In Example 26, the subject matter of claim 25 can optionally include determining the plurality of channel frequency indications based on system information received by the communication circuit from the second communication network.

In Example 27, the subject matter of any one of claims 19-26 can optionally include transmitting a message to the first communication network requesting the establishment of the call.

In Example 28, the subject matter of any one of claims 19-27 can optionally include the channel frequencies being stored by means of absolute radio frequency channel numbers.

In Example 29, the subject matter of any one of claims 19-28 can optionally include the first communication network being an LTE communication network.

In Example 30, the subject matter of any one of claims 19-29 can optionally include the second communication network being a GSM communication network.

In Example 31, the subject matter of any one of claims 19-30 can optionally include the call being a circuit-switched call.

In Example 32, the subject matter of any one of claims 19-31 can optionally include the call being a circuit-switched fallback call.

In Example 33, the subject matter of any one of claims 19-32 can optionally include storing a plurality of channel frequency indications indicating the plurality of channel frequencies in a non-volatile memory.

In Example 34, the subject matter of any one of claims 19-33 may optionally include being performed by a mobile phone.

In Example 35, the subject matter of any one of claims 19-34 can optionally include establishing the second radio link to the second communication network comprising camping on the second communication network.

Example 36 is a computer readable medium having recorded instructions thereon which, when executed by a processor, make the processor perform a method for performing radio communication according to any one of Examples 19 to 35.

Example 37 is a communication terminal comprising a communication means for establishing a first radio link to a first communication network; and receiving, via the first radio link to the first communication network, a message from the first communication network that indicates establishing a second radio link to a second communication network for a call; a controlling means for selecting at least one channel frequency from a plurality of stored channel frequencies provided for the call to the second communication network; and controlling the communication circuit to establish the second radio link to the second communication network using the selected at least one channel frequency and to establish the call via the established second radio link.

In Example 38, the subject matter of claim 37 can optionally include the controlling means being for measuring, for each channel frequency, a received signal quality and for determining a radio cell via which to establish a radio link to the second communication network based on the measured received signal quality.

In Example 39, the subject matter of claim 38 can optionally include the received signal quality for a channel frequency being a received signal strength of a signal received via the channel frequency.

In Example 40, the subject matter of any one of claims 38-39 can optionally include the controlling means being for determining the radio cell via which to establish a radio link to the second communication network based on a comparison of the measured received signal qualities.

In Example 41, the subject matter of any one of claims 38-40 can optionally include the controlling means being for determining the radio cell via which to establish a radio link to the second communication network by determining the radio cell operating at the channel frequency for which it has measured the best received signal quality.

In Example 42, the subject matter of any one of claims 37-41 can optionally include a memory for storing, for each of a plurality of second communication networks, a plurality of channel frequency indications wherein each channel frequency indication specifies a channel frequency of a radio cell of the respective second communication network and the controlling means being for searching among the channel frequencies of that second communication network for which the message indicates that the communication terminal being to establish a radio link to it.

In Example 43, the subject matter of any one of claims 37-42 can optionally include the controlling means being further for determining the plurality of channel frequencies and for storing a plurality of channel frequency indications indicating the plurality of channel frequency indications in a memory.

In Example 44, the subject matter of claim 43 can optionally include the controlling means being for determining the plurality of channel frequency indications based on system information received by the communication means from the second communication network.

In Example 45, the subject matter of any one of claims 37-44 can optionally include the communication means comprising a first transceiver for communicating with the first communication network and a second transceiver for communicating with the second communication network.

In Example 46, the subject matter of any one of claims 37-45 can optionally include the communication means being for transmitting a message to the first communication network requesting the establishment of the call.

In Example 47, the subject matter of any one of claims 37-46 can optionally include the channel frequencies being stored by means of absolute radio frequency channel numbers.

In Example 48, the subject matter of any one of claims 37-47 can optionally include the first communication network being an LTE communication network.

In Example 49, the subject matter of any one of claims 37-48 can optionally include the second communication network being a GSM communication network.

In Example 50, the subject matter of any one of claims 37-49 can optionally include the call being a circuit-switched call.

In Example 51, the subject matter of any one of claims 37-50 can optionally include the call being a circuit-switched fallback call.

In Example 52, the subject matter of any one of claims 37-51 can optionally include a non-volatile memory storing a plurality of channel frequency indications indicating the plurality of channel frequencies.

In Example 53, the subject matter of any one of claims 37-52 can optionally include the communication terminal being a mobile phone.

In Example 54, the subject matter of any one of claims 37-53 can optionally include establishing a radio link to the second communication network comprising camping on the second communication network.

It should be noted that one or more of the features of any of the examples above may be combined with any one of the other examples.

In the following, examples will be described in more detail.

Figure 9:
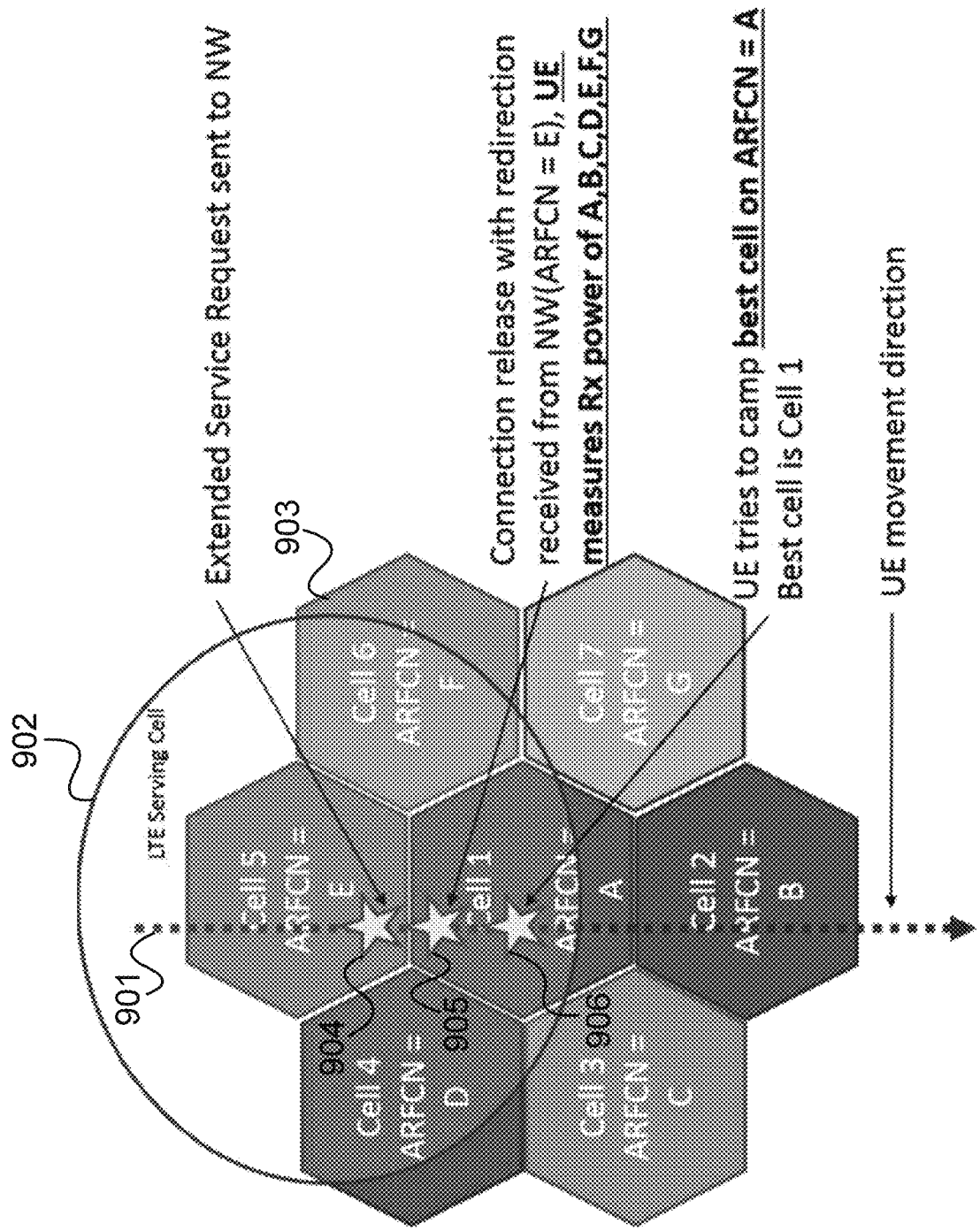
FIG. 9 illustrates a CSFB to a GSM network.

FIG. 9 illustrates a CSFB to a GSM network.

It is assumed that a mobile terminal moves along a path 901 through the coverage area of an LTE communication network including an LTE radio cell 902 and through the coverage area of a GSM communication network including a plurality of GSM cells 903 referred to as Cell 1 to Cell 7.

The LTE communication network for example corresponds to the first communication network with cells 201 of FIG. 2 and the GSM communication network for example corresponds to the second communication network with cells 203 of FIG. 2. It is assumed that the mobile terminal is camping on the LTE radio cell 902, i.e. the LTE radio cell 902 is the serving cell of the mobile terminal for the LTE communication network.

It is further assumed that the mobile terminal is configured for CSFB and that at a first position 904, the mobile terminal detects that a call with another communication terminal is to be established. For example, the mobile terminal receives paging information indicating that a call is to be established (i.e. there is a mobile-terminated call to be established) or its user has initiated a call by a corresponding input (i.e. there is a mobile-originated call to be established).

Accordingly, the mobile terminal sends an extended service request to the LTE communication network, e.g. to the E-UTRAN of the LTE communication network.

A certain time later, when the mobile terminal has moved to a second position 905, the LTE network sends a connection release message with redirection to the mobile terminal. This message can be seen as a message indicating that the mobile terminal is to establish a radio link to the UMTS communication network for the call. The communication network provides one ARFCN (Absolute Radio Frequency Channel Number), namely ARFCN=E, as redirected frequency.

However, when the mobile terminal is at a third position 906, the mobile terminal does not try to camp on the radio cell 903 with ARFCN=E (Cell 5) but measures the reception power of all cells, i.e. Cell 1 to Cell 7 corresponding to ARFCNs A to G. The mobile terminal thus determines that Cell 1 (ARFCN=A) is the best cell and tries to camp on Cell 1.

Figure 10:
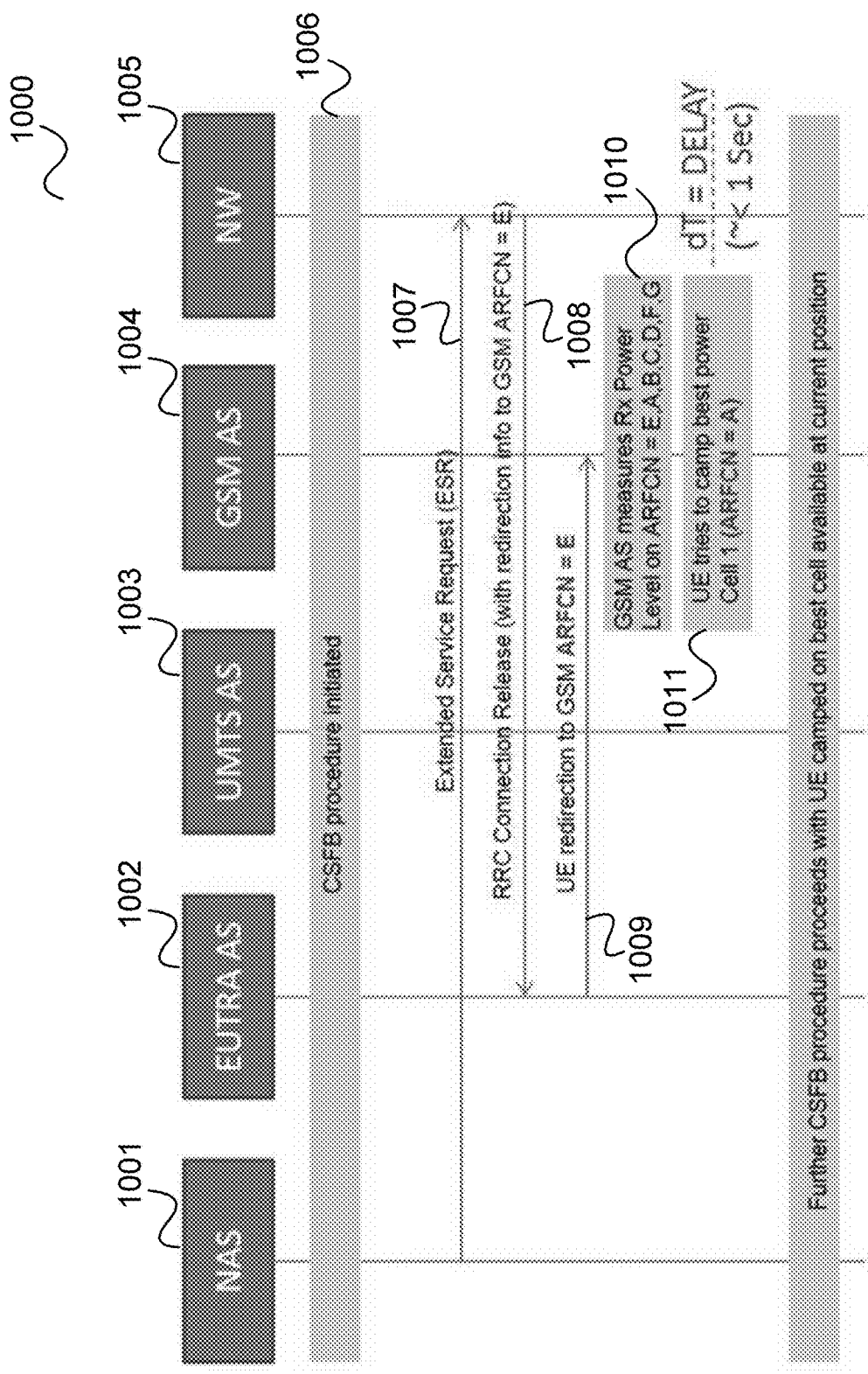
FIG. 10 shows a message flow diagram for a CSFB of a mobile terminal from an LTE network to a GSM network as illustrated in FIG. 9.

FIG. 10 shows a message flow diagram 1000 for a CSFB of a mobile terminal from an LTE network to a GSM network as illustrated in FIG. 9.

The message flow takes place between the mobile terminal's NAS (Non-Access Stratum) 1001, the mobile terminal's EUTRA AS (Access Stratum) 1002, the mobile terminal's UMTS AS 1003, the mobile terminal's GSM AS 1004 and the LTE network 1005, e.g. the LTE network's EUTRAN.

In 1006, the CSFB procedure is initiated, e.g. by a request for an MO or MT circuit-switched call.

In 1007, the mobile terminal's NAS 1001 transmits an extended service request message to the network 1005. In 1008, the network 1005 transmits an RRC connection release message to the mobile terminal's EUTRA AS 1002. As described with reference to FIG. 9, the RRC connection release message includes the redirection info that the mobile terminal is redirected to ARFCN=E.

In 1009, the mobile terminal's EUTRA AS 1002 informs the mobile terminal's GSM AS 1004 that a redirection to GSM with ARFCN=E is to be performed.

However, the mobile terminal's GSM AS 1004 measures, in 1010, the reception power level for ARFCNs A to G and tries, in 1011, to camp on the best cell as determined by the measurements, in this case, Cell 1 (corresponding to ARFCN=A).

Thus, a delay of e.g. below 1 second is caused and the CSFB procedure can proceed with the mobile terminal being camped cell available for the mobile terminal at the current position.

For the mobile terminal to know the operator's operating frequencies, i.e. ARFN A to G in the above example, it may for example dynamically store and update ARFCN values of cells of a particular PLMN in a non-volatile memory while reading GSM cell system information 3 or 4 an EARFCN of the PLMN (e.g. when in idle mode). This is illustrated in FIG. 11.

Figure 11:
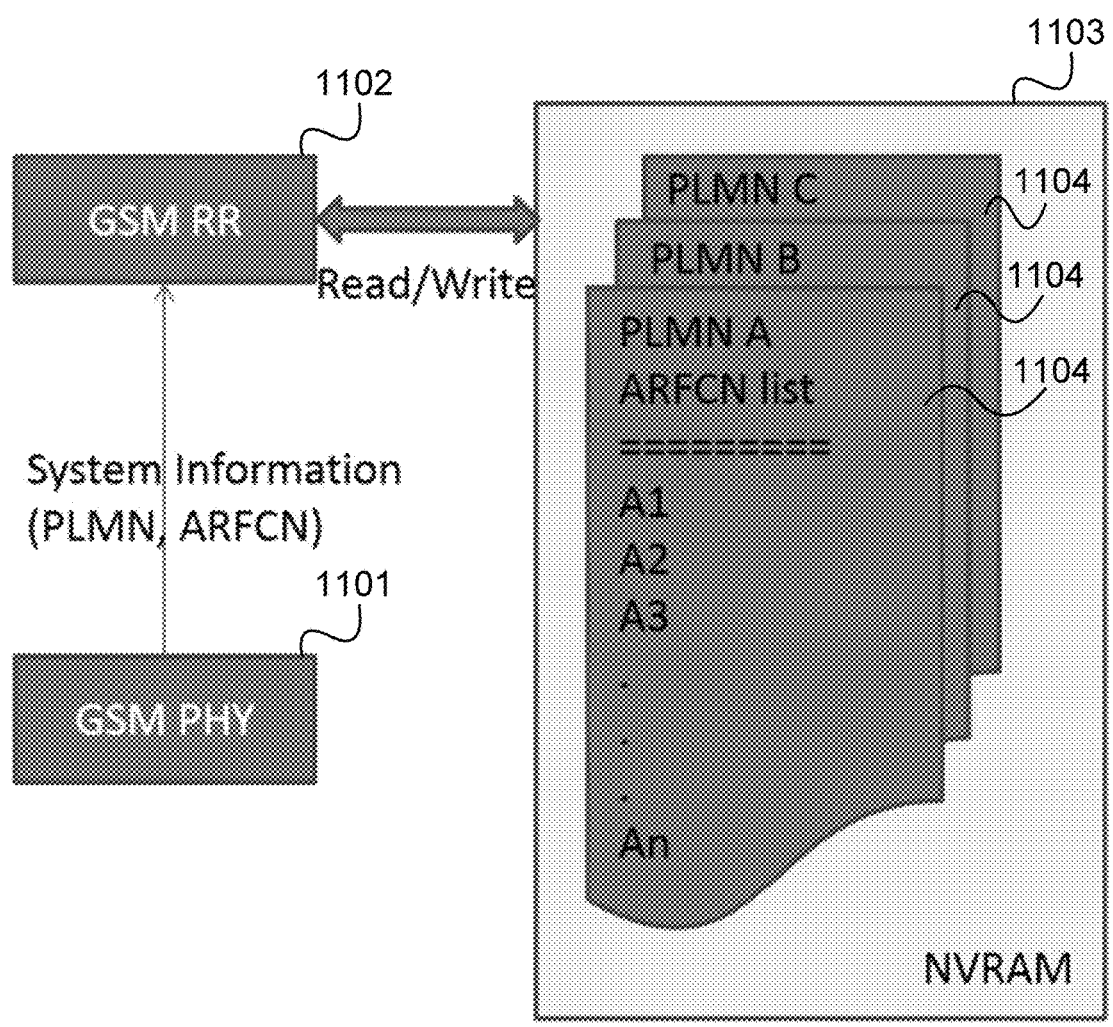
FIG. 11 illustrates an NVRAM storage of ARFCNs per PLMN in a mobile terminal.

FIG. 11 illustrates an NVRAM storage of ARFCNs per PLMN in a mobile terminal.

The mobile terminal receives system information from PLMNs the mobile terminal visits by means of its GSM physical layer 1101. The system information includes information about the ARFCNs used by the PLMNs. The mobile terminal's GSM RR (Radio Resource Management) layer 1102 gathers this information and stores it in NVRAM (non-volatile random access memory) 1103 of the mobile terminal. Specifically, the RR layer 1102 stores for each PLMN a list 1104 including the ARFCNs used by that PLMN.

Thus, when the mobile terminal is redirected to a PLMN, it can measure the received signal strength for each ARFCN included in the list of the PLMN and determine the best radio cell that is available of that PLMN as explained with reference to FIGS. 9 and 10.

The mobile terminal may dynamically handle the lists 1104 in various ways and may for example dynamically refresh/update the lists 1104. Further, it may optimize NVM memory usage in various ways such as compressing the lists 1104.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a communication circuit configured to
      establish a first radio link to a first communication network according to a first radio access technology (RAT); and
      receive, via the first radio link to the first communication network, a message from the first communication network that indicates establishing a second radio link to a second communication network according to a second RAT for a cell; wherein the second communication network is different from the first communication network;
   a controller configured to
      measure a single power level of one or more absolute radio frequency channel numbers (ARFCNs);
      sort the one or more ARFCNs into a cell rank list based on the single measured power level of the one or more ARFCNs;
      select one or more ARFCNs from the cell rank list; and
      control the communication circuit to establish a second radio link to a second communication network using the selected one or more channel frequencies and to establish the call via the established second radio link.

2. The communication terminal of claim 1, wherein the received signal quality for a channel frequency is a received signal strength of a signal received via the channel frequency.

3. The communication terminal of claim 1, wherein the controller is configured to determine the radio cell via which to establish a radio link to the second communication network based on a comparison of the measured received signal qualities.

4. The communication terminal of claim 1, wherein the controller is configured to determine the radio cell via which to establish a radio link to the second communication network by determining the radio cell operating at the channel frequency for which it has measured the best received signal quality.

5. The communication terminal of claim 1, comprising a memory configured to store, for each of a plurality of second communication networks, a plurality of channel frequency indications wherein each channel frequency indication specifies a channel frequency of a radio cell of the respective second communication network and the controller is configured to search among the channel frequencies of that second communication network for which the message indicates that the communication terminal is to establish a radio link to it.

6. The communication terminal of claim 1, wherein the controller is further configured to determine the plurality of channel frequencies and to store a plurality of channel frequency indications indicating the plurality of channel frequencies in a memory.

7. The communication terminal of claim 6, wherein the controller is configured to determine the plurality of channel frequency indications based on system information received by the communication circuit from the second communication network.

8. The communication terminal of claim 1, wherein the communication circuit comprises a first transceiver for communicating with the first communication network and a second transceiver for communicating with the second communication network.

9. The communication terminal of claim 1, wherein the communication circuit is configured to transmit a message to the first communication network requesting the establishment of the call.

10. The communication terminal of claim 1, wherein the channel frequencies are stored by means of absolute radio frequency channel numbers.

11. The communication terminal of claim 1, wherein the first communication network is an LTE communication network.

12. The communication terminal of claim 1, wherein the second communication network is a GSM communication network.

13. The communication terminal of claim 1, wherein the call is a circuit-switched call.

14. The communication terminal of claim 1, wherein the call is a circuit-switched fallback call.

15. The communication terminal of claim 1, comprising a non-volatile memory configured to store a plurality of channel frequency indications indicating the plurality of channel frequencies.

16. The communication terminal of claim 1, wherein the communication terminal is a mobile phone.

17. The communication terminal of claim 1, wherein establishing the second radio link to the second communication network comprises camping on the second communication network.

18. A method for establishing a call comprising:
- establishing a first radio link to a first communication network according to a first radio access technology (RAT);
- receiving, via the first radio link to the first communication network, a message from the first communication network that indicates establishing a second radio link to a second communication network according to a second RAT for a cell;
- wherein the second communication network is different from the first communication network;
- measuring a single power level of one or more absolute radio frequency channel numbers (ARFCNs);
- sorting the one or more ARFCNs into a cell rank list based on the single measured power level of the one or more ARFCNs;
- selecting one or more ARFCNs from the cell rank list; and
- establishing a second radio link to a second communication network using the selected one or more channel frequencies and establishing the call via the established second radio link.

19. A non-transitory computer readable medium having recorded instructions thereon which, when executed by a processor, make the processor perform a method for performing radio communication according to claim 18.

* * * * *